United States Patent [19]

Schuerfeld

[11] Patent Number: 5,492,441

[45] Date of Patent: Feb. 20, 1996

[54] CLAMPING DEVICE FOR CONNECTING MACHINE SPINDLES WITH TOOL HOLDERS

[75] Inventor: Horst Schuerfeld, Bielefeld, Germany

[73] Assignee: Gildemeister-Devlieg System-Werkzeuge GmbH, Bielefeld, Germany

[21] Appl. No.: 392,870

[22] PCT Filed: Sep. 8, 1993

[86] PCT No.: PCT/EP93/02427

§ 371 Date: Mar. 3, 1995

§ 102(e) Date: Mar. 3, 1995

[87] PCT Pub. No.: WO94/05451

PCT Pub. Date: Mar. 17, 1994

[30] Foreign Application Priority Data

Sep. 10, 1992 [DE] Germany .................. 9212205 U

[51] Int. Cl.$^6$ .................. B23C 9/00; B23B 31/00
[52] U.S. Cl. .................. 409/234; 82/160; 408/239 R
[58] Field of Search .................. 409/232, 234; 82/160; 408/239 R, 238; 403/297, 292

[56] References Cited

U.S. PATENT DOCUMENTS 2,485,799  10/1949  Woytych .................. 279/904 X
5,150,995   9/1992  Reinauer .................. 409/234
5,243,884   9/1993  Haga et al. .................. 82/160
5,257,884  11/1993  Stolz et al. .................. 409/232
5,388,936   2/1995  Mihic .................. 409/234

FOREIGN PATENT DOCUMENTS 0310942  4/1989  European Pat. Off. ..
0332036  9/1989  European Pat. Off. ..
8533253 U  1/1986  Germany .
85/03467  8/1985  WIPO .
88/05358  7/1988  WIPO .

Primary Examiner—William Briggs
Attorney, Agent, or Firm—Spencer & Frank

[57] ABSTRACT

A clamping device for connecting machine spindles or basic holders with tool holders or tools for machining comprises two partable damping elements (38,40;138,140) which are radially displaceably mounted in a holder (24;124) anchored in the machine spindle (10,110) or the basic holder and in the parted position engage behind an encircling clamping shoulder inside the tool holder (12;112). The clamping elements (38,40;138,140) extend crosswise to the longitudinal direction of the tool holder (12;112) and, at their lateral outer ends, have clamping surfaces (48,50,52,54;148,150,152,154) disposed such that all four clamping surfaces of the two clamping elements (38,40;138, 140) are each distributed over the periphery of the clamping shoulder at angular distances of approximately 90°.

11 Claims, 3 Drawing Sheets

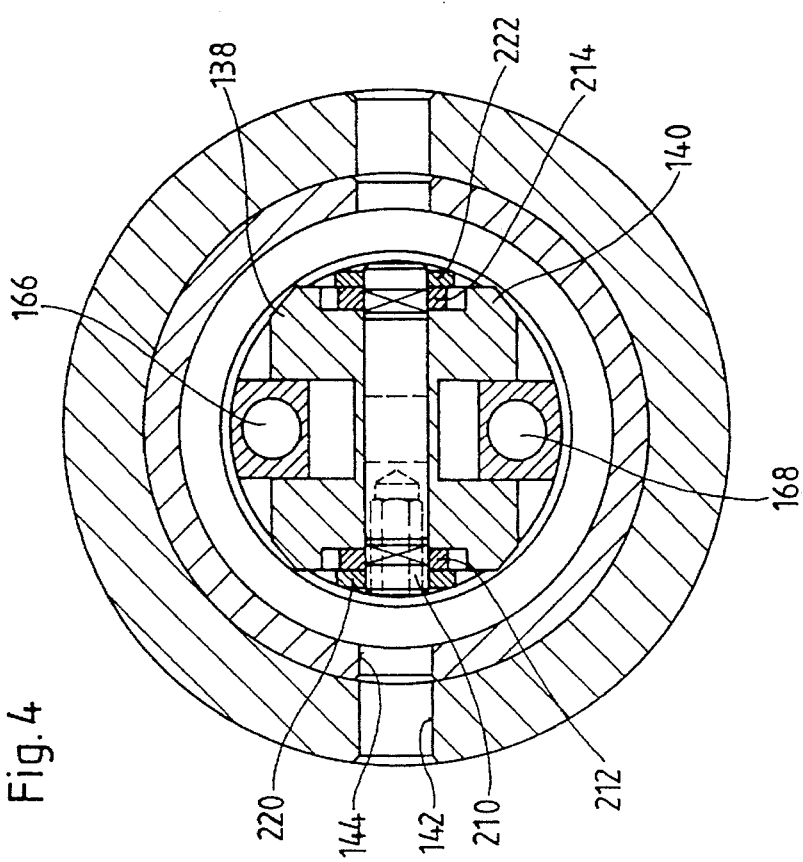
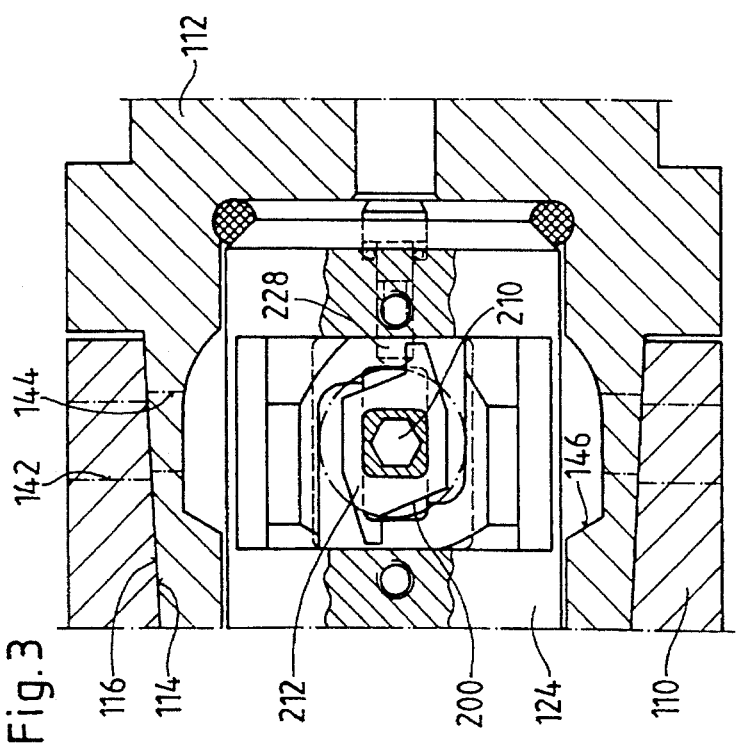
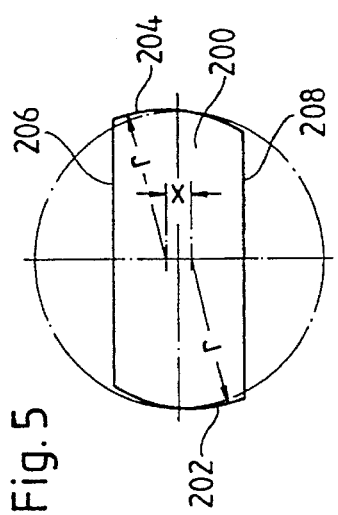

5,492,441

CLAMPING DEVICE FOR CONNECTING MACHINE SPINDLES WITH TOOL HOLDERS

The invention relates to a clamping device for connecting machine spindles or basic holders with tool holders or tools for the machining industry, with two partable clamping elements which are radially displaceably mounted in a holder anchored in the machine spindle or the basic holder and, in the parted position, engage behind an encircling shoulder inside the tool holder.

To fix tool holders or tools in machine spindles or basic holders, various radially partable clamping devices are known of. Examples are contained in EP-B 0 172 850 and WO 88/05358. The same applies with respect to tool holders with tapered hollow shanks according to DIN 69893. Where possible, clamping devices of this type ought to be able to be operated both automatically and manually.

A disadvantage of some of the prior art solutions is that the parted clamping elements essentially only engage behind the clamping shoulders of the tool holder at two opposite points. This means that the connection only has a high degree of rigidity along the axial plane which passes through the two points, whilst the rigidity where there are bending forces in directions outside the said plane can be insufficient.

It is virtually impossible to effect a uniform parting of more than two clamping elements at reasonable cost. If, on the other hand, the clamping elements are provided with arched clamping surfaces adapted to the ring shape of the clamping shoulder of the tool holder it is usually impossible to design the clamping shoulder, the clamping elements, the parting mechanism and the contingent arrangement of these parts with enough precision to allow the clamping surfaces to rest along their entire surface against the clamping shoulder with essentially uniform pressure. Thus the power transmission will, in this case too, take place entirely, or at least predominantly, via certain individual points, whose position the manufacturer cannot influence.

The invention is thus based on the task of creating a clamping device of the genetic type, which ensures that the power transmission between the machine spindle and the tool holder is distributed as evenly as possible over the periphery, thus ensuring a high degree of rigidity in the connection between the two.

In a clamping device of the aforementioned type, this task is solved according to the invention in that the clamping elements extend crosswise to the longitudinal direction of the tool holder and have clamping surfaces at the lateral-outer ends which are disposed such that all four clamping surfaces of the two clamping elements are each distributed over the periphery of the clamping shoulder at angular distances of approx. 90°.

The fact that each of the clamping elements has two clamping surfaces ensures that the clamping elements automatically adjust themselves on clamping such that essentially the same force is transmitted over both clamping surfaces. The same also applies for the distribution of force between the two clamping elements. Thus a very uniform distribution of the force transmitted over the periphery is achieved, and the rigidity of the connection is high.

A differential screw is preferably provided to part the clamping elements.

At one end the differential screw has a hexagon socket or another device for connecting a tool. The tool is introduced through aligned radial bores in the tool holder and the machine spindle.

The clamping elements are preferably radially displaceably mounted in opposite pockets in the holder. The pockets are connected via a radial through-bore in which the differential screw lies.

Because of the very flat taper which tool holders of this type usually have, the connection between the tool holder and the machine spindle is self-locking. Devices for ejecting the tool holder after the clamp has been loosened are therefore advantageous.

For this purpose, the clamping elements of this invention have sloped surfaces which, when drawn together, run up against axially parallel pins longitudinally displaceably disposed in the holder, which interact with the tool holder with an ejecting effect when the clamping elements are drawn together.

Alternatively, the parting device for the clamping elements is an eccentric cam which lies rotatably between the clamping elements and which has two opposite cam surfaces. Parting the clamping elements with the aid of an eccentric has the advantage over the differential screw of the eccentric only having to be rotated by maximum 90°. With a differential screw, however, several full rotations are always required to part the clamping elements. This is particularly disadvantageous if the clamping mechanism has to be operated in a position which is difficult to reach, or where space is restricted due to other components.

In contrast to the aforementioned differential screw, an eccentric cam is not able to exert an inwardly directed pull to loosen the clamping jaws. According to the invention, the eccentric is therefore connected with at least two radially projecting jaws which engage in undercut pockets on the inside of the clamping elements in such a way that they exert a radially inwardly directed pulling effect on the clamping elements when the eccentric cam is loosened. The clamping elements have to be fully retracted into the contour of the holder to allow the tool holder to be removed from the spindle.

The clamping elements are radially displaceably mounted in this holder. Since the eccentric cam, in contrast to the differential screw, is not permanently connected with the clamping elements its position inside the holder between the clamping elements is not sufficiently defined. Therefore, two linking elements which bridge the recess are connected at both ends with the holder and support the axis of the eccentric cam in the central portion. There is a small amount of play in the connection between the linking elements and the holder, or between the linking elements and the eccentric cam, so that the eccentric cam can adjust itself of its own accord between the two clamping elements.

In view of this fixed position, the eccentric cam can also be used to eject the tool holder out of the machine spindle when the clamping elements are in the loosened position. For this purpose, at least one sloped surface is contrived on the tool holder in the trajectory of one of the cam surfaces when in motion whilst the clamping elements are being loosened, which the cam surface runs up against.

The eccentric cam is operated - in a similar fashion to the differential screw - with the aid of an engaging device on at least one front face end of the eccentric cam, a device which permits a tool, a hollow hexagon wrench, for example, to be connected. In the machine spindle and the tool holder there are, in axial prolongation of the eccentric cam, radial bores aligned with each other, which allow the tool to be introduced.

Preferred embodiments of the invention will be described below with reference to the enclosed drawings.

FIG. 3 is a longitudinal section through another embodiment of the invention;

FIG. 4 shows a cross-section of FIG. 3;

FIG. 5 is an enlarged diagrammatic view of an eccentric cam;

Figure 1:
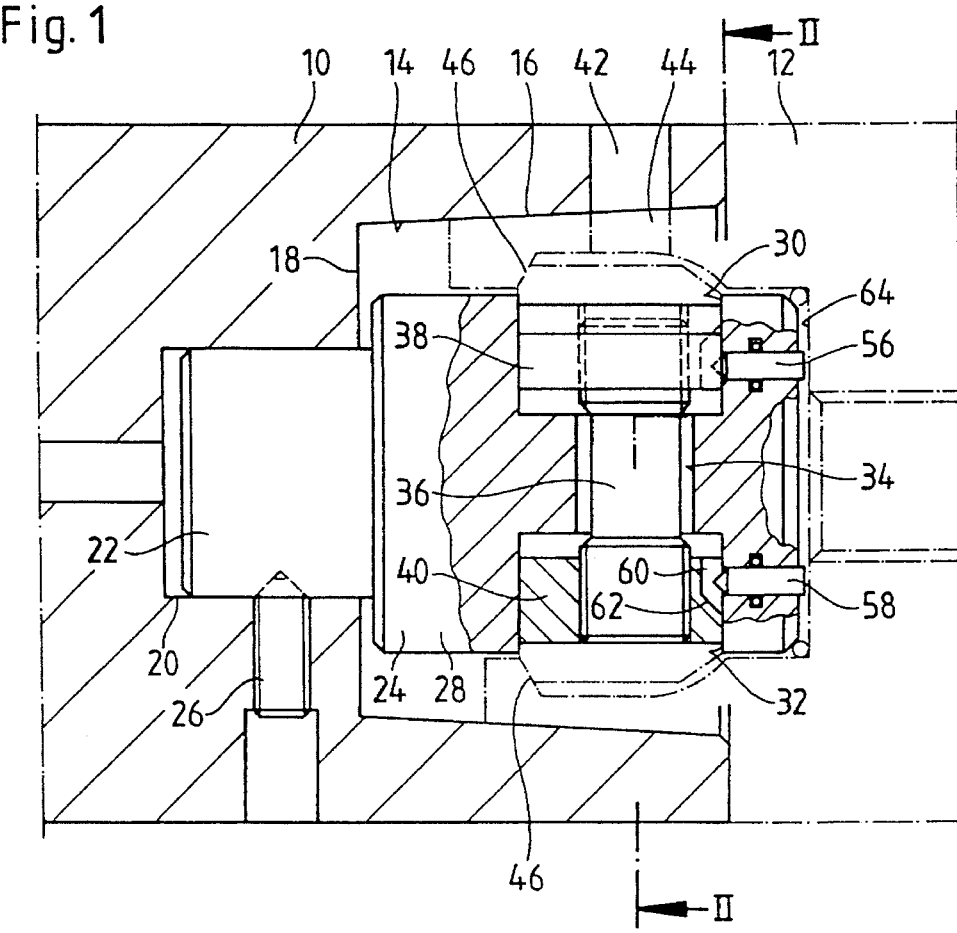
FIG. 1 is a longitudinal section through a clamping device according to the invention in connection with parts of a machine spindle and a tool holder.

FIG. 1 shows a longitudinal section of the interacting areas of a machine spindle 10 and a tool holder 12. The description below will only mention machine spindles and tool holders, in place of which there may, however, be a basic holder on the one hand and a tool on the other. The tool holder 10 has a flat inner taper 14, which engages with a corresponding outer taper 16 in the tool holder 12. Proceeding from the base, designated as 18, of the inner taper 14 there is a concentric blind bore 20 with a smaller diameter.

In the blind bore 20 lies a cylindrical journal 22 of a holder designated overall as 24 of a clamping device to be explained below. The journal 22 is fixed in the blind bore 20 with the aid of radially disposed stud bolts 26 screwed into the machine spindle 10 from the outside. Inside the inner taper 14, the holder 24 widens to form a cylindrical section 28 in whose central portion are located two radially opposite pockets 30,32 which are connected via a through radial bore 34. Positioned in the radial bore 34 is a differential screw 36 with two oppositely coiled thread portions (not designated) at both ends. These thread portions are screwed into two block-shaped clamping elements 38,40, which are radially displaceably mounted in the aforementioned pockets 30,32 of the holder 24. When the differential screw 36 is rotated, the clamping elements 38 are thus radially displaced inside the pockets 30,32 and are thereby parted or drawn together.

To effect this rotation the differential screw 36 has, on the end positioned at the top in FIG. 1, a hexagon socket (not shown) or suchlike, which can be reached with the aid of a corresponding tool via two radial bores 42,44 aligned with each other in the machine spindle 10 and the tool holder 12.

Figure 2:
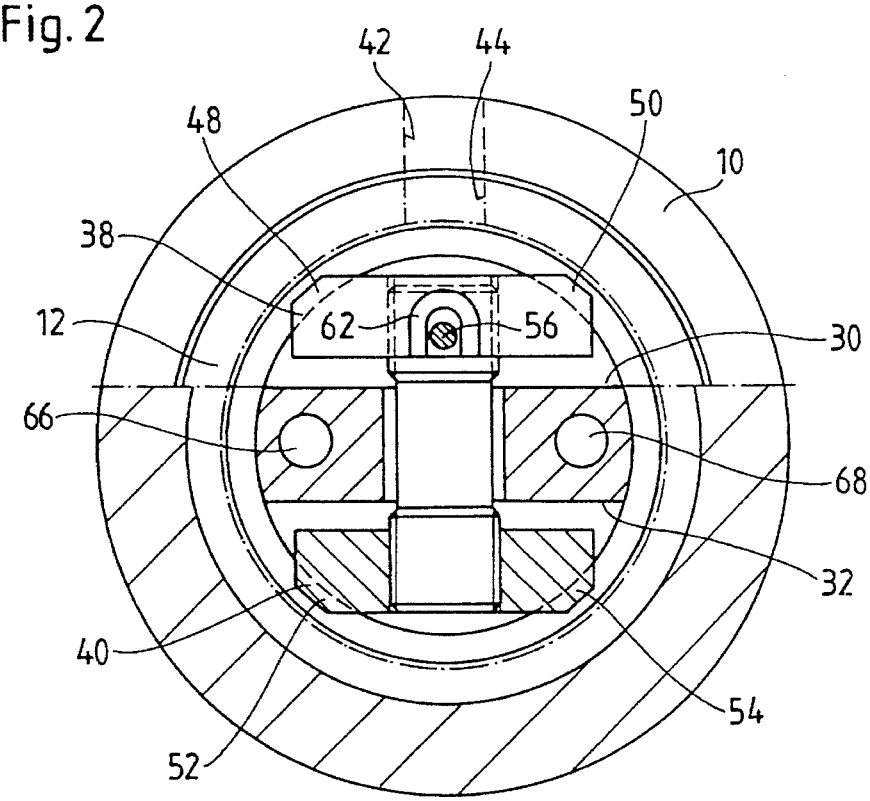
FIG. 2 is a section along the line 2—2 in FIG. 1.

As FIG. 2 shows, the clamping elements 38,40 have a shape which is elongated in the transverse direction. This has the effect that, in the parted position, the clamping elements only engage at their two lateral outer ends or corners with an inwardly projecting clamping shoulder 46 which is provided according to the aforementioned standard inside tool holders of the type under discussion. This gives a total of four clamping surfaces 48,50,52,54 on the two clamping elements 38,40, which are evenly distributed over the periphery of the clamping shoulder 46. This results in a very uniform distribution of the power transmission. Furthermore, the connection has a high degree of rigidity.

It can be seen from FIG. 1 that the clamping shoulder 46 of the tool holder 12 is sloped inwardly. The clamping surfaces of the clamping elements 38,40 are provided with a corresponding inclination. In this way, when the clamping elements 38,40 are radially parted, the outer taper 16 of the tool holder is drawn into the inner taper 14 of the machine spindle to the left in FIG. 1. Furthermore, the flange (not shown) adjoining the inner taper of the tool holder positions itself tightly against the ring-shaped front face of the machine spindle.

Disposed in axially parallel bores in the portion of the holder 24 which lies, with reference to FIG. 1, to the right of the pockets 30,32 are displaceable pins 56,58. Towards the left in FIG. 1, the pins have a tapered or truncated end. On the side closest to the pins 56,58, the clamping elements 38,40 have recesses 60, in which the pins 46,48 can engage to the left in FIG. 1. The recesses 60 are limited on the radial outer side by sloped surfaces 62. When the clamping elements 38,40 are drawn together, the sloped surfaces 62 run up against the pins 56,58 and displace the pins to the right in FIG. 1. There, the pins come up against an inside base 64 of the tool holder so that they exert a pressure to the right in FIG. 1 on the tool holder. This interrupts the self-locking connection between the inner taper 14 and the outer taper 16.

FIG. 1 shows that in the holder 24 there are axially parallel coolant bores 66, 68, which allow a coolant to be passed through the machine spindle to the tool.

With reference to FIGS. 3 to 6, another embodiment of the invention will now be described in which the clamping elements are parted with the aid of an eccentric. To simplify matters, the parts of the second embodiment which are equivalent to the corresponding parts of the first embodiment will simply be designated by a reference numeral which has been increased by "100", and will not be explained again separately.

Figure 7:
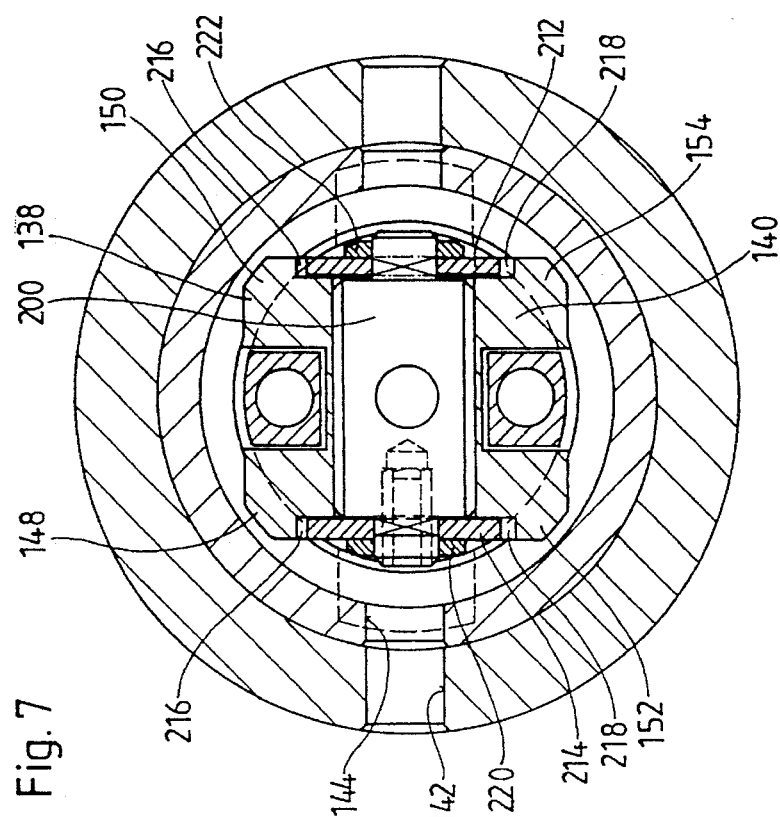
FIGS. 6 and 7 are a longitudinal section and a cross-section corresponding to FIGS. 3 and 4, but show a tool holder in the clamped position.

Thus FIGS. 3 to 6 show a machine spindle 110 with a tool holder 112. Anchored in the machine spindle in the manner already illustrated is a holder 124. When inserted into the machine spindle, the outer taper 116 of the tool holder 112 comes into contact with the inner taper 114 of the machine spindle. When this happens the holder 124 engages in an appropriately shaped recess inside the tool holder 112. Furthermore, an encircling clamping shoulder 146 is contrived in this recess. Positioned at approximately the same height in a recess (not shown) in the holder 124 are the two partable clamping elements 138,140 which, as shown in FIGS. 4 and 7, again have the already described four clamping surfaces 148,150,152,154 positioned at an angular distance of approx. 90°.

Figure 6:
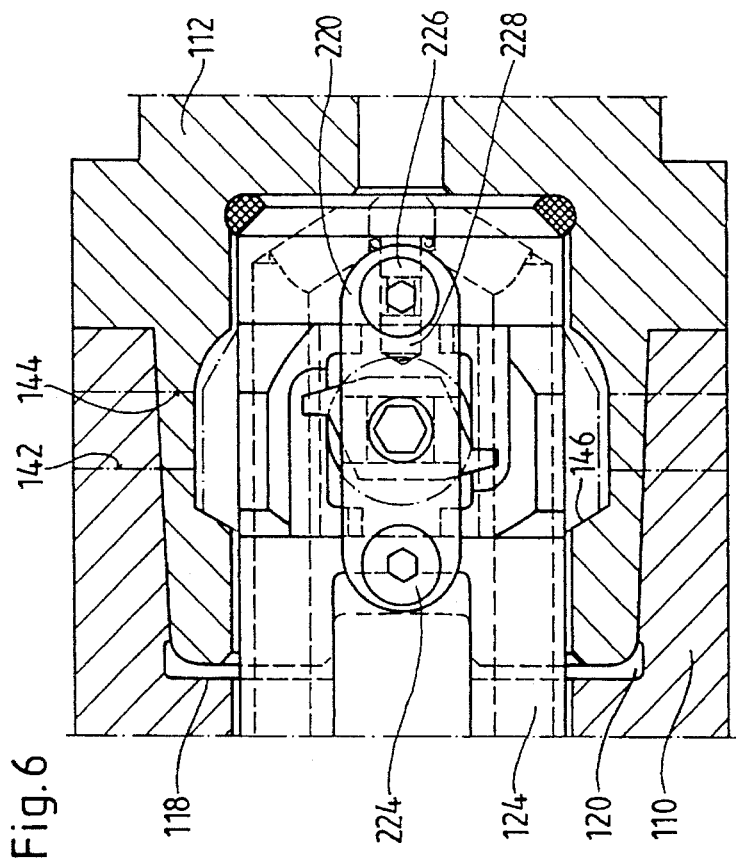

The machine spindle 110 and the tool holder 112 again have, on diametrically opposing sides, bores 142,144 which are aligned with each other but are offset by 90° with respect to the embodiment of FIGS. 1 and 2 and which, in FIGS. 3 and 6, are only shown in the position of the first embodiment by a dash-dot line. The bores serve i.a. to accommodate a tool for clamping the tool holder.

Figure 8:
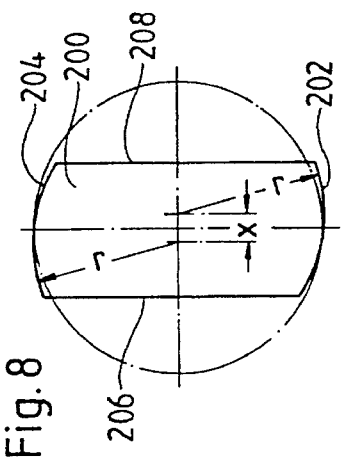
FIG. 8 is equivalent to FIG. 5 and shows the eccentric cam in the corresponding position.

In the second embodiment described here, the clamping elements 138,140 are parted with the aid of an eccentric cam 200, which lies between the two clamping elements 138, 140. The eccentric cam 200 shown enlarged and in a diagrammatic cross-section in FIGS. 5 and 8 has two opposite cam surfaces 202,204 and two opposite, flat, parallel walls 206,208. When the eccentric cam is rotated out of the horizontal position as shown in FIG. 5 into the vertical position of FIG. 4, the two clamping elements 138,140 are gripped on the facing sides and pressed apart by the cam surfaces 202,204 until they are clamped behind the clamping shoulder 146 of the tool holder. The eccentric cam 200 is rotated with the aid of a hexagon socket located in one of the front faces, to the left of FIGS. 4 and 7 in this example, and which allows a socket spanner to be accommodated by the radial bores 142, 144.

Coaxial to the eccentric cam 200, attached to its two ends, there are jaw discs 212,214 from which proceed two opposite radially outwardly projecting jaws (not designated), which can be seen in FIGS. 3 and 6. On the way into the parted position of the eccentric cam, these jaws engage in recesses 216,218 on the inside of the clamping elements which, in their left end portion in FIGS. 3 and 6, have an undercut (not designated) which, when the eccentric cam is rotated back from the position in FIG. 6 to the position in FIG. 3, allows the clamping elements to be driven radially inwards and thereby loosened.

In contrast to the first embodiment, no permanent connection exists in the second embodiment between the two clamping elements and their parting element. The eccentric cam therefore has to be guided. Two linking elements 220,222 are provided for this purpose, which bridge the recess in the holder in which the two clamping elements 138,140 are mounted, on opposite sides of the holder 124, and are attached to the holder 124 at both ends with the aid of screws 224,226. The two front face ends of the eccentric cam 200 are rotatably mounted in the central portion of the two linking elements.

Because of the very flat taper connection between the outer taper 116 and the inner taper 114 self-locking occurs, so that it can still be difficult to remove the tool holder even when the clamping elements have already been loosened. FIGS. 3 and 6 therefore show a centric pin 228 which proceeds from the base of the recess in the tool holder 112 and runs through a bore (not designated) in the holder 124 and into the recess therein. There, the pin, whose end is very sloped or truncated, is positioned in the trajectory of the eccentric cam so that the latter, when it returns to the horizontal position of FIG. 5, exerts pressure on the pin and ejects the tool holder.

I claim:

1. A clamping device for connecting machine spindles or basic holders with tool holders or tools for machining, with two partable damping elements (38,40;138,140), which are radially displaceably mounted in a holder (24;124) anchored in the machine spindle (10;110) or the basic holder and, in the parted position, engage behind an encircling clamping shoulder inside the tool holder (12;112), characterized in that the clamping elements (38,40;138,140) extend crosswise to the longitudinal direction of the tool holder (12;112) and have clamping surfaces (48,50,52,54;148,150,152,154) at the lateral-outer ends which are disposed such that all four clamping surfaces of the two clamping elements (38,40; 138, 140) are each distributed over the periphery of the clamping shoulder at angular distances of approximately 90°.

2. The clamping device of claim 1, characterized in that the clamping elements (38,40) have oppositely coiled tapped holes which accommodate oppositely coiled threaded sections of a differential screw (36).

3. The clamping device of claim 2, characterized in that at one end of the differential screw (36) there is an engaging device for a lathe tool, and in that in prolongation of the differential screw (36) there are radial bores (42,44) aligned with each other in the machine spindle (10) and the tool holder (12).

4. The clamping device of claim 1, characterized in that the clamping elements (38,40) are displaceably mounted in opposite pockets (30,32) in an essentially cylindrical holder (24).

5. The clamping device of claim 4, characterized in that, on the radial surface positioned in the direction of the tool holder (12), the clamping elements (38,40) o have sloped surfaces (62), and in that in the holder there are axially parallel, longitudinally displaceable pins (56,58) which engage at one end in the pockets (30,32) and which the sloped surfaces (62) run up against when the clamping elements (38,40) are drawn together, whilst the other ends of the pins (56,58) abut against an inside base (64) of the tool holder (12).

6. The clamping device of claim 1, characterized in that to part the clamping elements (138,140), there is, positioned between the clamping elements, a rotatable eccentric cam (200) with two opposite cam faces (202,204).

7. The clamping device of claim 6, characterized in that connected with the eccentric cam (200) there are at least two radially projecting jaws (212,214), which engage in undercut pockets (216,218) on the inside of the clamping elements (138,140) in such a way that they exert a radially inwardly directed pulling effect on the clamping elements when the eccentric cam (200) is loosened.

8. The clamping device of claim 6, characterized in that the clamping elements (138,140) are radially displaceably mounted in a recess in the holder (124) and in that the recess on both front faces of the eccentric cam (200) is bridged by linking elements (220,222) which are connected at both ends with the holder (124) and which pivot the eccentric cam (200) in the central portion.

9. The clamping device of claim 7, characterized in that, contrived in the trajectory of one of the cam surfaces (202,204) of the eccentric cam (200) there is at least one sloped surface (228) connected with the tool holder (112), which the cam face runs up against when the clamping elements are loosened, thereby ejecting the tool holder.

10. The clamping device of claim 9, characterized in that the sloped surface is contrived on the head of a pin (228) proceeding from the tool holder (112).

11. The clamping device of claim 6, characterized in that at one end at least, the eccentric cam has an engaging device (210) for connecting a tool and in that in axial prolongation of the eccentric cam, there are radial bores (142,144) aligned with each other in the machine spindle (110) and the tool holder (112).

* * * * *